Jan. 5, 1960   H. H. HAAS   2,919,767
LUBRICATION SYSTEM
Filed Oct. 15, 1956   2 Sheets-Sheet 1
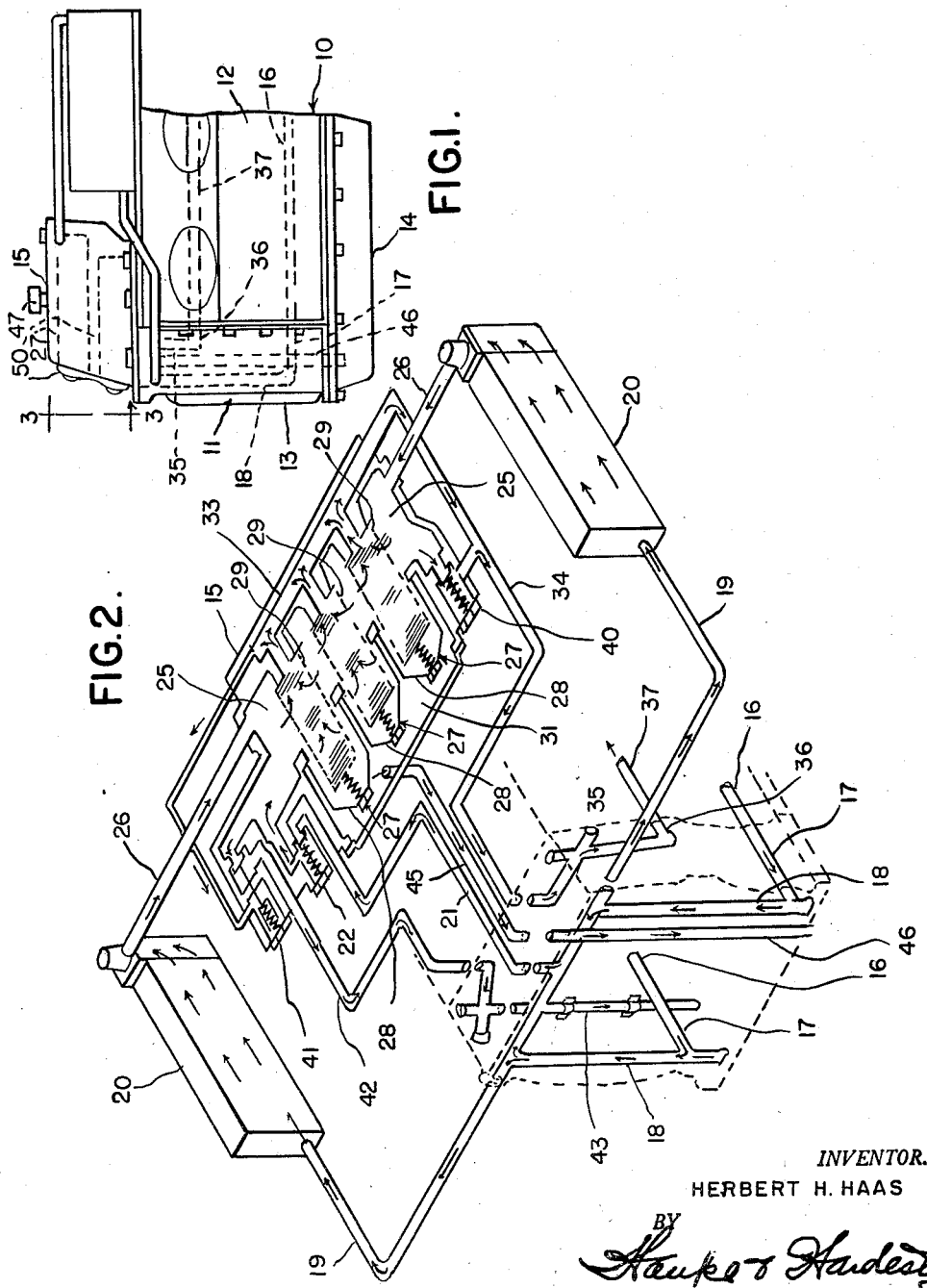
INVENTOR.
HERBERT H. HAAS
BY
Hauke & Hardesty
ATTORNEYS

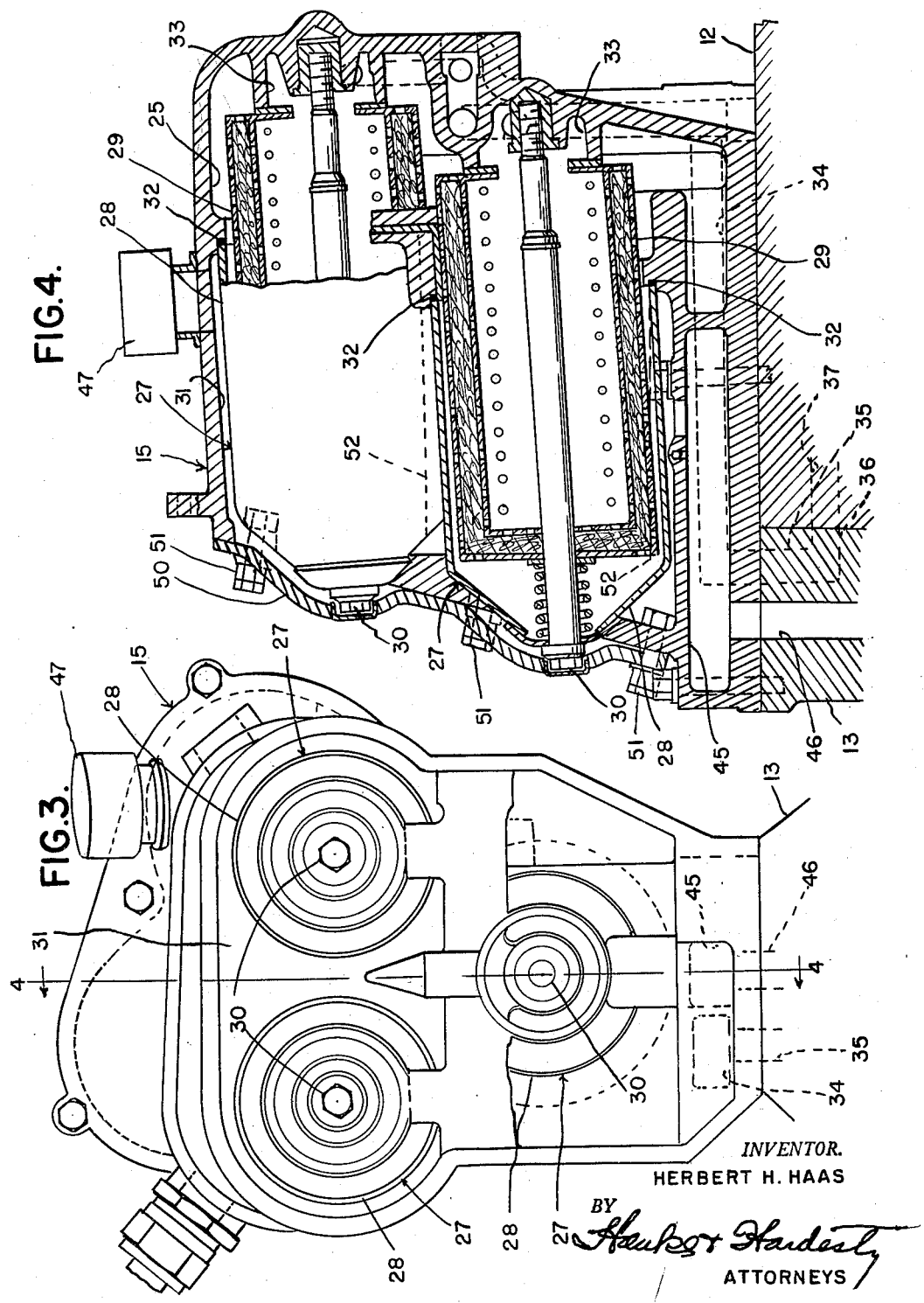

United States Patent Office 2,919,767
Patented Jan. 5, 1960

2,919,767

LUBRICATION SYSTEM

Herbert H. Haas, Royal Oak, Mich., assignor, by mesne assignments, to Continental Motors Corporation, Muskegon, Mich., a corporation of Virginia Application October 15, 1956, Serial No. 615,800

10 Claims. (Cl. 184—6)

My invention relates to lubrication systems for internal combustion engines and more particularly to an engine structure embodying horizontally disposed oil filters.

Usually, oil filters for internal combustion engines are disposed on the lower side of the engine and are removed from the bottom, the oil from the filter being thus permitted to drip into the filter container during removal. However, when it is impractical to utilize this type of assembly, the oil filter is generally installed on the side or end of the engine in which case the oil, during removal, spills from the filter cartridge over the engine, which is quite unsatisfactory.

An object of my invention is to facilitate replacement of engine oil filters by providing a separate oil filter housing so constructed to catch oil spilled during removal and return it to the engine.

Another object of my invention is to provide for simpler engine manufacture by constructing separately a crankcase, damper housing, and oil filter housing, each having simplified interconnecting oil passages.

A clearer understanding of the invention may be had by reference to the accompanying drawings illustrating a preferred embodiment of the invention in which like characters refer to like parts throughout the several views and in which—

Fig. 1 is a fragmentary side elevational view of an engine embodying the invention.

Fig. 2 is a perspective diagrammatic view of the oil system with which the invention is concerned.

Fig. 3 is an elevational end view of the oil filter housing with the cover removed for convenience, as seen substantially from the line 3—3 of Fig. 1, and Fig. 4 is a cross-sectional view taken substantially on the line 4—4 of Fig. 3.

As illustrated in Fig. 1, an internal combustion engine 10 comprises a crankcase structure 11 including a main crankcase housing 12 and a damper housing 13, an oil pan 14, and an oil filter housing 15. Horizontal oil delivery passages 16 extend horizontally through the crankcase housing from the oil pressure pumps (not shown) and communicate with short horizontal connecting passages 17 in the damper housing 13. Vertical passages 18 in the damper housing 13 are connected through pipes 19 to engine oil coolers 20 and through a passage 21 in the oil filter housing 15 to a cooler bypass valve 22.

Oil from the coolers 20 is passed through pipes 26 and into the chamber 25 provided in the filter housing 15, and the bypass valve 22 short circuits into an oil pressure chamber 25, as illustrated in Fig. 2.

Filter assemblies 27, comprising containers 28 and conventional filter elements 29 are horizontally supported in the filter housing 15 and secured therein by any means such as through bolts 30. A drain chamber 31 in the filter housing 15 is separated from the pressure chamber 25 by the closed containers 28, whose open ends are supported against sealing rings 32. The filter element open ends are supported in the filter housing pressure chamber 25 with the inner spaces in communication with an outlet chamber 33 and an outlet passage 34, which is connected to a vertical passage 35 in the damper housing 13. Passage 35 is connected through a short horizontal passage 36 in the damper housing 13 to a horizontal oil passage 37 in the crankcase housing 12 leading to the main crankshaft bearings (not shown) for lubricating purposes.

The filter housing pressure chamber 25 communicates with a filter bypass valve 40 which has its outlet communicating with the outlet passage 34, and with a pressure regulator 41 having its outlet connecting with a drain passage 42 communicating with a vertical drain passage 43 in the damper housing 13.

The drain chamber 31 communicates with a drain passage 45 in the lower portion of the filter housing 15, the passage 45 being connected to another vertical drain passage 46 in the damper housing 13. The drain passage 46 leads to a sump or reservoir portion of the oil pass 14, hereafter called the crankcase sump.

This construction and arrangement thus provides that a crankcase breather 47 may be conveniently openly connected with the drain chamber 31 as shown in Fig. 4, there being no air motion at this location during engine operation. Crankcase blow-by may pass upward through the drain passages 46 and 45 into the drain chamber 31 and through the breather to atmosphere.

Any number of filter assemblies 27 may be housed in the filter housing 15, which may be appropriately constructed to support them. A preferable construction, shown in Figs. 3 and 4, supports three filter assemblies 27, two being disposed at a higher level than the third and having the inner ends extending beyond the inner end of the lower. The housing 15 is provided with an inclined access cover 50 secured thereto by any means such as bolts 51. Removal of the access cover 50 exposes the containers 28 in the chamber 31. The bolts 30 may be removed and the filter assemblies 27 horizontally removed. Oil drippings from the filter elements 29 and from the interior of the containers 28 will drain from the chamber 31 into the drain passage 45, and down to the crankcase sump through the passage 46 rather than spilling out over the engine.

The outer ends of the filter assemblies 27 are preferably disposed at a lower level than the inner ends, so that oil sludge will collect in the containers 28 as indicated by the lines 52 in Fig. 4 and will be removed with said containers rather than being returned to the engine.

This engine construction provides for simplified machining of the crankcase structure 11 since the oil passages in the main crankcase housings 12 are generally horizontal, all of the vertical oil passages being provided in the separate damper housing. The damper and filter housings may also be conveniently constructed as a single integral housing if desired. The filter housing provides a convenient mounting base for the oil system components such as the bypass valves and the pressure regulator. Thus a standard crankcase is provided which is readily adaptable to any variation of oil system. Also, all of the more complicated drillings and interconnections being included in the damper and filter housings facilitate making more simplified machining operations on the crankcase. Maintenance of the horizontal oil filter assemblies 28 is readily accomplished because the filter housing 15 is designed for preventing oil from spilling over the engine.

Although I have described and illustrated but one preferred embodiment of my invention, it will be apparent to one skilled in the art to which the invention pertains that various changes and modifications may be made therein without departing from the spirit of the invention or the scope of the appended claims.

I claim:

1. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means normally sealing off said drain chamber from said pressure chamber, means communicating said drain chamber with the crankcase sump and arranged to drain oil from said drain chamber to said sump, means communicating said pressure chamber with said crankcase pressure oil passages, an oil filter assembly removably supported in said housing structure, and said drain chamber arranged to receive oil drippings from said filter assembly during removal thereof from said housing structure.

2. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means communicating said drain chamber with the crankcase sump and arranged to drain oil from said drain chamber to said sump, means communicating said pressure chamber with said crankcase pressure oil passages, an oil filter assembly removably supported in said housing structure, said filter assembly comprising a container having an outer closed end and an inner open end normally communicating only with said pressure chamber, a filter element removably carried in said container, and said drain chamber arranged to receive oil drippings from said container and from said filter element only during removal of said filter assembly from said housing structure.

3. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means normally sealing off said drain chamber from said pressure chamber, means communicating said drain chamber with the crankcase sump and arranged to drain oil from said drain chamber to said sump, means communicating said pressure chamber with said crankcase pressure oil passages, an elongated oil filter assembly removably supported in said housing structure, and said drain chamber arranged to receive oil drippings from said filter assembly during removal thereof from said housing structure, said sealing means being arranged to open said drain chamber to said pressure chamber only on removal of said filter assembly, said filter assembly being substantially horizontally supported in said housing structure and being constructed and arranged for selective longitudinal removal therefrom to prevent oil sludge in said filter assembly from dripping into said pressure chamber.

4. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means communicating said drain chamber with the crankcase sump and arranged to drain oil from said drain chamber to said sump, means communicating said pressure chamber with said crankcase pressure oil passages, an oil filter assembly removably supported in said housing structure, said filter assembly comprising a container having an outer closed end and an inner open end normally communicating only with said pressure chamber, a filter element removably carried in said container, and said drain chamber arranged to receive oil drippings from said container and from said filter element only during removal of said filter assembly from said housing structure, said container outer end being disposed at a lower level than the inner end and arranged to collect oil sludge dropping from said filter element and to retain said sludge during removal of said filter assembly from said housing structure.

5. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means normally sealing off said drain chamber from said pressure chamber, means communicating said drain chamber with the crankcase sump and arranged to drain oil from said drain chamber to said sump, means communicating said pressure chamber with said crankcase pressure oil passages, a plurality of elongated oil filter assemblies individually removably supported in said housing structure and arranged on substantially horizontal parallel axes, said sealing means being arranged to open said drain chamber to said pressure chamber only on removal of said filter assemblies; said filter assemblies being disposed in an inverted V arrangement with upper filter assemblies laterally offset from the lowermost filter assembly and being constructed and arranged for longitudinal removal from said housing structure to prevent oil sludge in said filter assemblies from dripping into said pressure chamber, and said drain chamber arranged to receive oil drippings from said filter assemblies during selective individual removal thereof from said housing structure.

6. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means communicating said drain chamber with the crankcase sump and arranged to drain oil from said drain chamber to said sump, means communicating said pressure chamber with said crankcase pressure oil passages, an oil filter assembly removably supported in said housing structure, and said drain chamber arranged to receive oil drippings from said filter assembly during removal thereof from said housing structure, and said housing structure having a breather element openly communicating said drain chamber with atmosphere for venting said crankcase through said means communicating the drain chamber with the crankcase sump.

7. In an internal combustion engine having a crankcase structure provided with an oil sump, and a pressure lubricating oil system including pressure oil passages in said crankcase structure, an oil filter housing structure removably secured to said crankcase and having a drain chamber and a pressure chamber, means normally sealing off said drain chamber from said pressure chamber, means communicating said drain chamber with the crankcase sump and arranged to drain oil from said drain chamber to said sump, means communicating said pressure chamber with said crankcase pressure oil passages, an elongated oil filter assembly removably supported in said housing structure, and said drain chamber arranged to receive oil drippings from said filter assembly during removal thereof from said housing structure, said housing structure provided with a removable cover at the outer end of said drain chamber, said filter assembly being substantially horizontally supported and arranged for selective longitudinal removal from the outer end of said drain chamber to prevent oil sludge in said filter assembly from dripping into said pressure chamber.

8. In an internal combustion engine having a crankcase structure provided with an oil sump disposed at the lower portion thereof and a pressure lubricating oil system including predominantly substantially longitudinal pressure oil passages, a damper housing structure removably secured to one end of said crankcase structure and provided with predominantly substantially vertical pressure oil passages and short horizontal passages connecting said vertical oil passages directly with the crankcase oil passages, and an oil treating instrumentality mounted on the top of said damper housing and having pressure oil passages directly connected wtih the upper ends of said damper vertical passages, said oil treating instrumentality having a drain passage, and said damper housing structure provided with a substantially vertical drain passage directly communicating said first drain passage, and means connecting said first drain passage with atmosphere for venting said crankcase through said damper housing vertical drain passage.

9. In an internal combustion engine having a crankcase structure provided with an oil sump disposed at the lower portion thereof and a pressure lubricating oil system including predominantly substantially longitudinal pressure oil passages, a damper housing structure removably secured to one end of said crankcase structure and provided with predominantly substantially vertical pressure oil passages and short horizontal passages connecting said vertical oil passages directly with the crankcase oil passages, and an oil treating instrumentality mounted on the top of said damper housing and having pressure oil passages directly connected with the upper ends of said damper vertical passages, said oil treating instrumentality having a drain passage, and said damper housing structure provided with a substantially vertical drain passage directly communicating said first drain passage with said crankcase oil sump, and said oil treating instrumentality having a breather element openly communicating said first drain passage with atmosphere for venting said crankcase through said damper housing vertical drain passage.

10. In an internal combustion engine having a crankcase structure provided with an oil sump disposed at the lower portion thereof and a pressure lubricating oil system including predominantly substantially longitudinal pressure oil passages, a damper housing structure removably secured to one end of said crankcase structure and provided with predominantly substantially vertical pressure oil passage and short horizontal passages connecting said vertical oil passages directly with the crankcase oil passages, and an oil treating instrumentality mounted on the top of said damper housing and having pressure oil passages directly connected with the upper ends of said damper vertical passages, said oil treating instrumentality having a drain passage, and said damper housing structure provided with a substantially vertical drain passage directly communicating said first drain passage with said crankcase oil sump, and said oil treating instrumentality having a breather element openly communicating said first drain passage with atmosphere for venting said crankcase through said damper housing vertical drain passage, said oil treating instrumentality comprising an oil filter housing structure having a drain chamber and a pressure chamber respectively connected with said oil treating instrumentality drain passage and pressure passages, said oil treating instrumentality drain passage and said damper housing drain passage being arranged to drain oil from said drain chamber to said crankcase oil sump, an oil filter assembly removably supported in said filter housing structure, and said drain chamber arranged to receive oil drippings from said filter assembly during removal thereof from said filter housing structure.

References Cited in the file of this patent
UNITED STATES PATENTS

| | | |
|---|---|---|
| 1,948,479 | Caminez | Feb. 20, 1934 |
| 2,071,529 | Howard | Feb. 23, 1937 |
| 2,119,619 | Bauer | June 7, 1938 |
| 2,322,772 | Pennebaker | June 29, 1943 |
| 2,331,119 | Gouldbourn | Oct. 5, 1943 |
| 2,633,991 | Beatty | Apr. 7, 1953 |
| 2,737,933 | Swenson | Mar. 13, 1956 |
| 2,801,006 | Hultgren et al. | July 30, 1957 |